June 19, 1945. R. L. ANDERSON 2,378,677
REFLECTING DEVICE
Filed Nov. 16, 1943 2 Sheets-Sheet 1

R. L. Anderson
INVENTOR.

BY *Knowles*
ATTORNEYS.

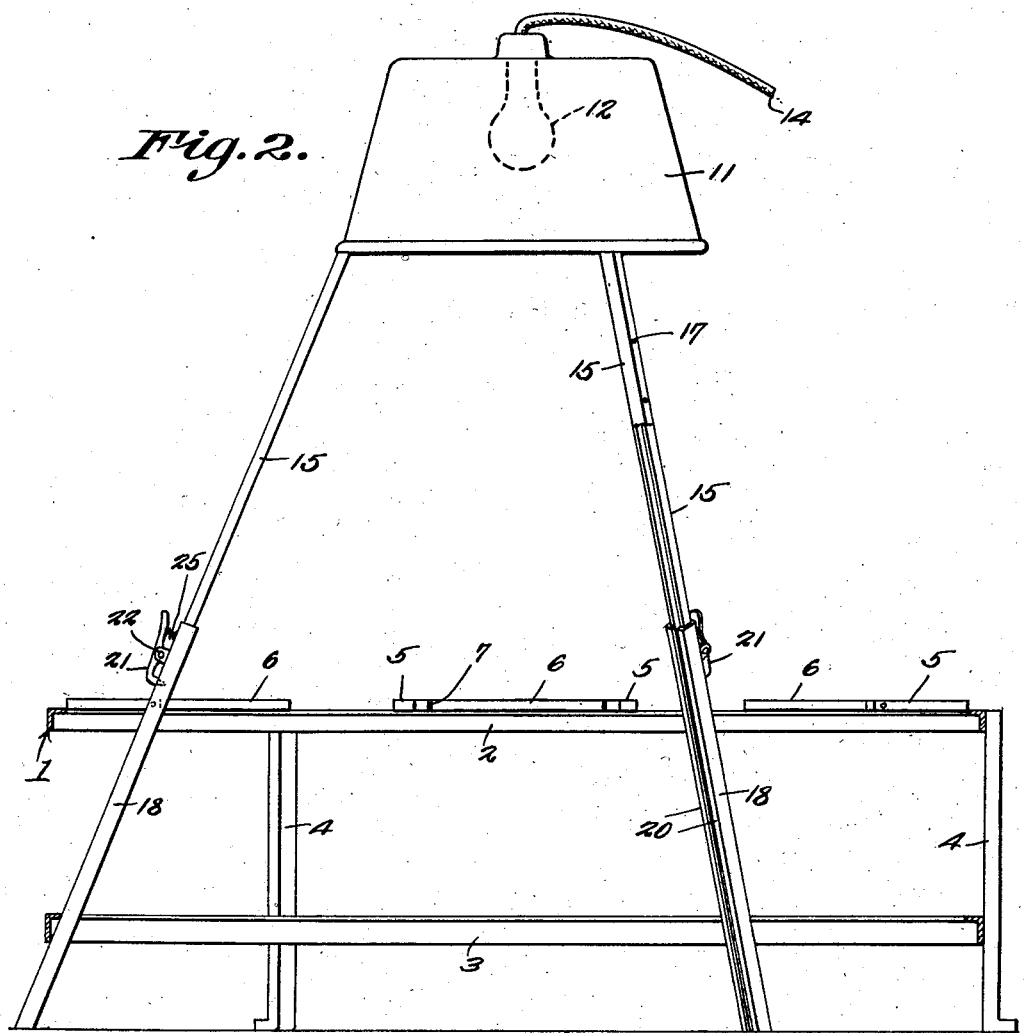
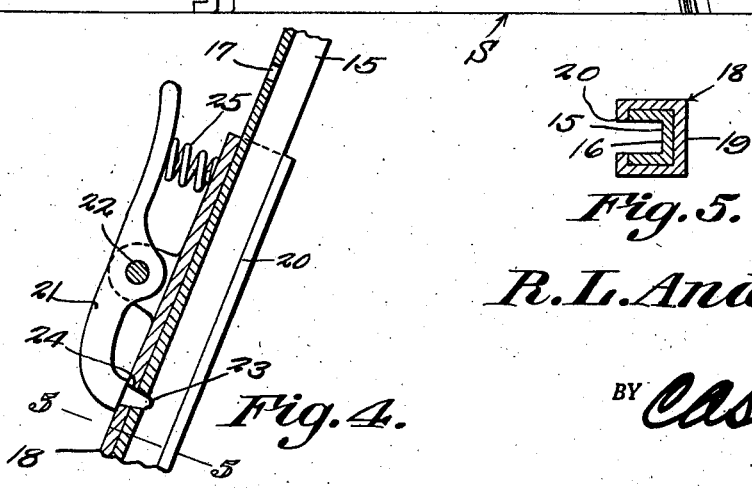

Patented June 19, 1945

2,378,677

UNITED STATES PATENT OFFICE 2,378,677

REFLECTING DEVICE

Robert L. Anderson, Talmage, Calif.

Application November 16, 1943, Serial No. 510,517

3 Claims. (Cl. 240—1.2)

The device forming the subject matter of this application affords novel means whereby light may be shed downwardly from an overhead source, to be received by a plurality of lower reflectors disposed about said source, the lower reflectors being so mounted that they will have a wide range of movement to concentrate or diffuse the light proceeding from them, the size of the area reflected, and the elevation thereof, being under the control of an operator.

The invention aims, further, to provide a simple instrumentality characterized by structural features promoting the result hereinbefore alluded to.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 2 is a transverse section wherein most parts appear in elevation, portions being broken away;

Fig. 4 is a section on the line 4—4 of Fig. 1;

Fig. 5 is a transverse section on the line 5—5 of Fig. 4.

Figure 1:
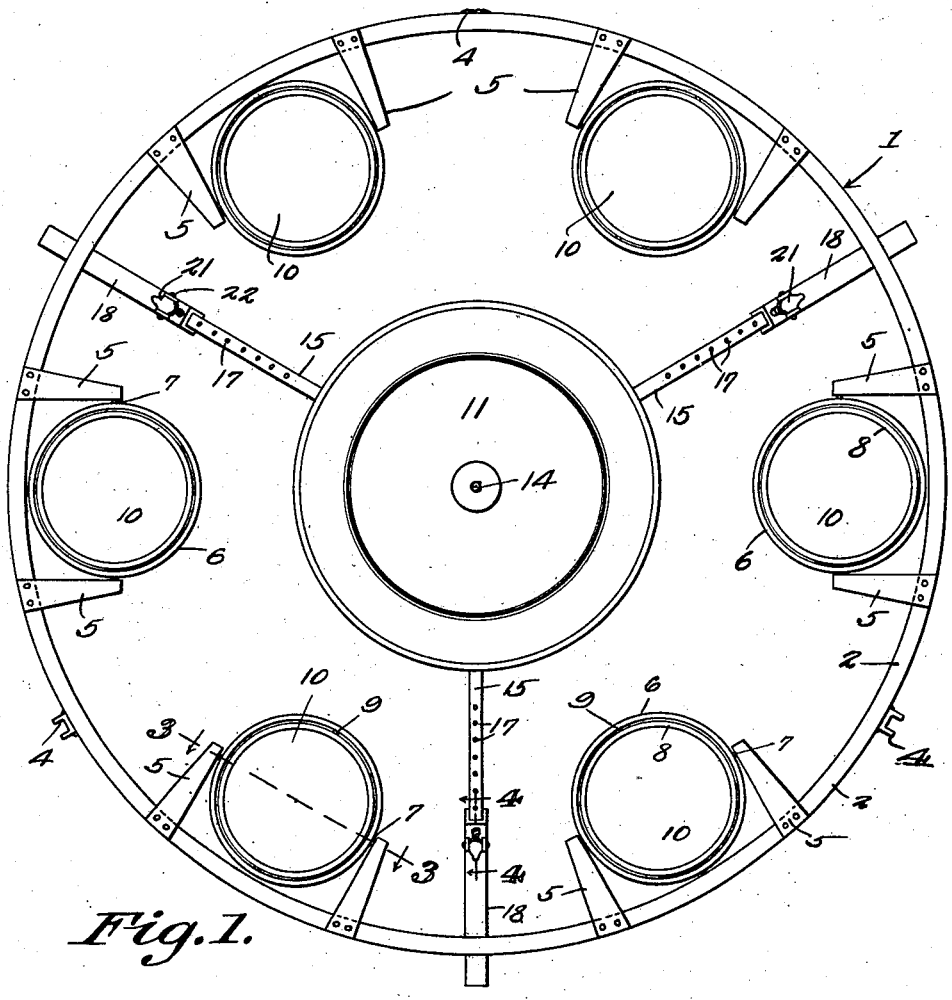
Fig. 1 shows in top plan, a device constructed in accordance with the invention.
Figure 3:
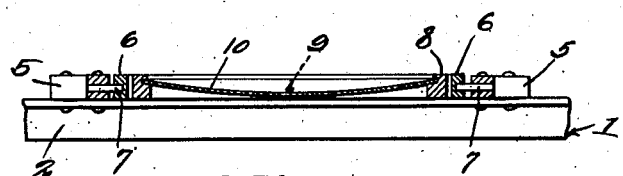
Fig. 3 is a transverse section on the line 3—3 of Fig. 1.

In carrying out the invention there is provided a stand 1, which may be constructed in various ways, without departing from the spirit of the invention. Preferably, the stand 1 includes an upper annular member 2 and a lower annular member 3, the annular members being of the same diameter. In cross section, the members 2 and 3 may be angles. The annular members 2 and 3 are connected by standards 4, spaced apart transversely as may be desired, the standards being adapted to rest at their lower ends on any supporting structure S which may be available.

The upper member 2 of the stand 1 carries circumferentially spaced horizontal, inwardly projecting brackets 5. The brackets 5 are arranged in pairs, and between the brackets of each pair is located a ring 6 tiltable on pivot elements 7 which are located in chordal relation to the upper annular member 2, the pivot elements being mounted in the brackets 5. Inner rings 8 are disposed within the outer rings 6. The inner rings 8 are connected to the outer rings 6 by pivot elements 9, disposed radially of the upper annular member 2 of the stand 1. The inner rings 8 carry upwardly facing reflectors 10. The construction is such that the reflectors 10 are mounted on gimbals, for substantially universal swinging movement.

Owing to the provision of the inwardly projecting brackets 5, the upper annular member 2 of the stand 1 is disposed outwardly of the rings 6 and 8 and the reflectors 10, the annular member, thus, serving as a protection for the parts specified.

The numeral 11 designates a hollow reflector, of dish-like, inverted, frusto-conical form, located above the stand 1. Within the reflector 11 there is a lamp 12, operated in any desired way, the lamp being an electric lamp if desired, as the conductor cable 14 indicates.

The upper reflector 11 is sustained, preferably, upon a tripod, the upper portions of the legs of the tripod being marked by the numeral 15. The upper portions of the tripod legs may be inwardly facing channels, as shown at 16 in Fig. 5, the upper portions of the tripod legs being secured to the reflector 11. The upper portions 15 of the tripod legs have longitudinally spaced seats or openings 17.

The lower portions 18 of the tripod legs are channels, as shown at 19 in Fig. 5 and slide on the outside of the upper portions 15 of the tripod legs, the lower portions 18 having inwardly projecting flanges 20, which overlap the edges of the side walls of the upper portions 15 of the legs and hold the leg parts 18 and 15 together for relative longitudinal sliding movement. The tripod legs are disposed within the annular members 2 and 3 of the stand 1, and the lower members 18 of the tripod legs rest on the support S. When the parts are arranged as shown in Fig. 2, the legs of the tripod engage the inner edges of the lower annular member 3 of the stand 1.

In order to hold the tripod legs at adjusted lengths, thereby to vary the position of the upper reflector 11 relatively to the lower reflectors 10, lever latches 21 are fulcrumed intermediate their ends, as at 22, on the lower portions 18 of the tripod legs, the latches having, each, a reduced nose 23 (Fig. 4), movable in an opening 24 in the lower leg portion 18 and adapted to be received in any of the longitudinally spaced seats 17 of the upper portions 15 of the tripod legs, under the impulse of a spring 25 interposed between the lower leg portion 18 and the free end of the latch 21.

In practical operation, the upper reflector 11 causes the lamp 12 to shed its rays downwardly on the lower reflectors 10, and the reflectors 10, in turn, direct the rays upwardly. Since the outer rings 6 can be tilted on the pivotal connections 7, the reflectors 10 may be tilted downwardly and inwardly, causing the rays proceeding upwardly from the reflectors 10 to meet at a point well above the reflector 11 and upon a single airplane or other elevated object. When a larger field is desired, for instance, when there are several airplanes above the device, the inner edges of the outer rings 6 may be elevated. Any one of the rings 6, or all of them, may be tilted downwardly and outwardly at their outer edges, and, thus, a field of considerable area will be illuminated.

The inner rings 8 and the reflectors 10 may be tilted, singly or together, upon radial axes represented by the pivot elements 9 and, therefore, illumination may be provided longitudinally of the line 3—3 of Fig. 1, instead of transversely of that line. In general, the reflectors 10 have a wide range of movement, either as individual parts or as a group.

The device will be found to be useful in connection with war operations, in the moving picture industry, and under many other conditions which will suggest themselves readily to the user.

Since the upper portions 15 of the tripod legs are secured to the reflector 11, when relative longitudinal movement between the parts 15 and 18 of the legs takes places, the legs are spaced inwardly with respect to the lower ring 3, and, therefore, the tripod and the reflector 11 may be shifted horizontally, with respect to the vertical axis of a circle passing through the geometrical center of the lower reflectors 10. In this way, the direction in which light is thrown upwardly by the lower reflectors 10 may be varied. If the vertical axis of the reflector 11 coincides with the center of a circle passing through the centers of the lower reflectors 10, all of those reflectors will receive light uniformly.

What is claimed is:

1. In a reflecting device, a stand comprising a ring, inwardly projecting brackets mounted on the ring and disposed in pairs, an upwardly facing lower reflector located between the brackets of each pair, the ring being located outwardly of the lower reflectors to serve as a guard therefor, gimbal structure mounting the lower reflectors on the brackets of the respective pairs, for universal tilting movement, a downwardly-facing upper reflector disposed higher than the lower reflectors and so located as to reflect light downwardly upon the lower reflectors, a lamp illuminating the upper reflector, and a tripod carrying the upper reflector and extended downwardly through the ring, to rest on a common support with the stand.

2. In a reflecting device, a stand comprising upper and lower rings and standards connecting the rings, upwardly-facing lower reflectors disposed in a circle, means for mounting the lower reflectors for universal tilting movement, inwardly of the upper ring, whereby the upper ring will serve as a guard for the lower reflectors, a downwardly-facing upper reflector disposed higher than the lower reflectors and so located as to reflect light downwardly upon the lower reflectors, and a multipod sustaining device connected to the upper reflector and extended downwardly through both rings, to rest on a common support with the stand, the sustaining device engaging within the lower ring, to centralize the upper reflector with respect to said circle, and means for illuminating the upper reflector.

3. In a reflecting device, a stand comprising upper and lower rings and standards connecting the rings, upwardly-facing lower reflectors disposed in a circle, means for mounting the lower reflectors for universal tilting movement, inwardly of the upper ring, whereby the upper ring will serve as a guard for the lower reflectors, a downwardly-facing upper reflector disposed higher than the lower reflectors and so located as to reflect light downwardly upon the lower reflectors, and a sustaining device connected to the upper reflector and extended downwardly through both rings, to rest on a common support with the stand, the sustaining device being engageable with the lower ring, to centralize the upper reflector with respect to said circle, and means for illuminating the upper reflector.

ROBERT L. ANDERSON.